(12) United States Patent
Endo

(10) Patent No.: US 7,217,013 B2
(45) Date of Patent: May 15, 2007

(54) ELECTRIC LIGHT FOR WORK AND SUPPORT DEVICE FOR ELECTRIC LIGHT FOR WORK

(76) Inventor: Toshiaki Endo, #201, 31-7, Kitami 4-chome, Setagaya-ku (JP)

( * ) Notice: Subject to any disclaimer, the term of this patent is extended or adjusted under 35 U.S.C. 154(b) by 153 days.

(21) Appl. No.: 10/458,581

(22) Filed: Jun. 9, 2003

(65) Prior Publication Data
US 2004/0246712 A1    Dec. 9, 2004

(51) Int. Cl.
*F21V 21/096* (2006.01)
(52) U.S. Cl. .................. 362/398; 362/190; 362/191; 362/421
(58) Field of Classification Search .............. 362/190, 362/191, 398, 399, 400, 421, 426, 427
See application file for complete search history.

(56) References Cited

U.S. PATENT DOCUMENTS 4,907,769 A * 3/1990 Hunley et al. ............ 248/185.1
6,644,827 B2 * 11/2003 Birdwell ..................... 362/202

* cited by examiner

*Primary Examiner*—Laura K. Tso
(74) *Attorney, Agent, or Firm*—Jordan and Hamburg LLP

(57) ABSTRACT

An electric light for work comprises an electric light body having a grip part formed in the shape of a stick; an engagement member formed in the shape of a C letter, one of fixing and engaging fixedly and detachably with a back end of the grip part of the electric light body; and a support stand attached via a rotatable member which can rotate more than 120 degrees with adding the power more than predetermined quantity to a back end portion of a approximately center part of the engagement member, capable of adhering fixedly to the metal surface by magnetism so that the grip part of the electric light body adheres rotatably to the metal face at 90 degrees or more, and the electric light for work an be used under such condition.

5 Claims, 17 Drawing Sheets

ELECTRIC LIGHT FOR WORK AND SUPPORT DEVICE FOR ELECTRIC LIGHT FOR WORK

BACKGROUND OF THE INVENTION

This invention relates to the electric light for work and the support device for electric light for work used in case of the reconditioning a car etc.

The conventional electric light for work is covered by the lattice-shaped cover around the outer circumferential part of the electric bulb thereof so as to install in the floor, and the grip part of the electric light for work is used as a support device and it includes an engagement member which engages fixedly the grip part of the cylindrical electric light for work, attaching t the sphere and a support stand with the magnet which supports rotatably the sphere.

In the conventional electric light covered with the cover of the shape of a lattice, when an engine room etc. is fixed, a repair part cannot be illuminated.

Moreover, when the electric light for work with a cylindrical grip part is supported by a support device for the electric light, the electric light can be used which the support stand of the support device adsorb to the metal surface so that it is not necessary to have the single hand. However, the engagement member rotates at only about 30 degrees to the right-and-left direction so that the required place cannot fully be illuminated.

SUMMARY OF HE INVENTION

Accordingly, it is an object of the invention to provide a the electric light for work and the support device for electric light for work which can use the electric light body, capable of rotating at more than 90 degrees, by adhering fixedly the grip part thereof to the metallic surface.

Novel features which are believed to be characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

DETAILED DESCRIPTION OF THE PREFERRED EMBODIMENTS

Figure 1:
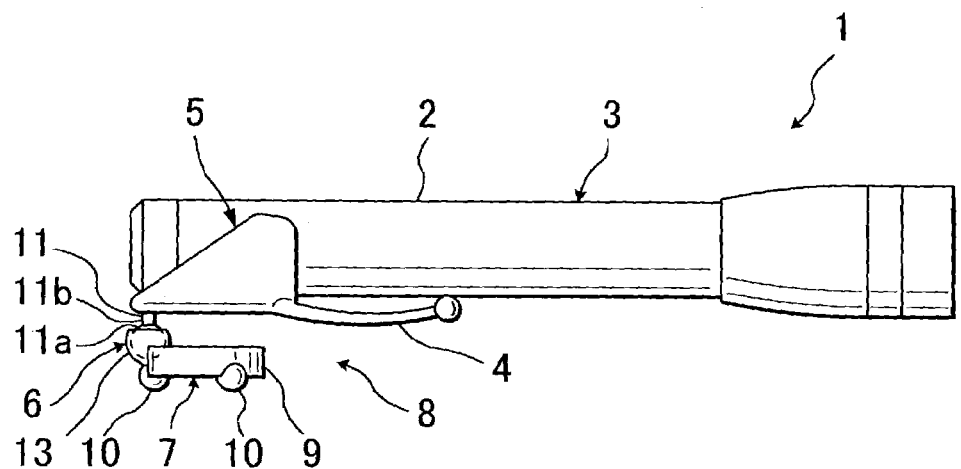
FIG. 1 is a front view showing a first embodiment of the present invention.
Figure 2:
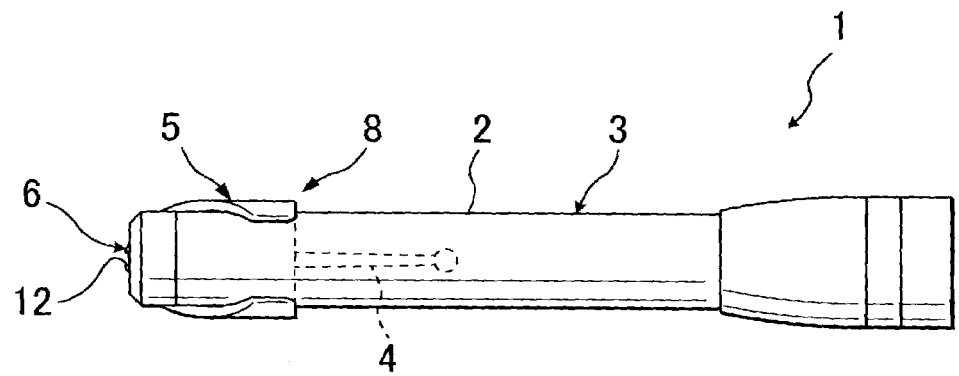
FIG. 2 is a top plan view showing a first embodiment of the present invention.
Figure 3:
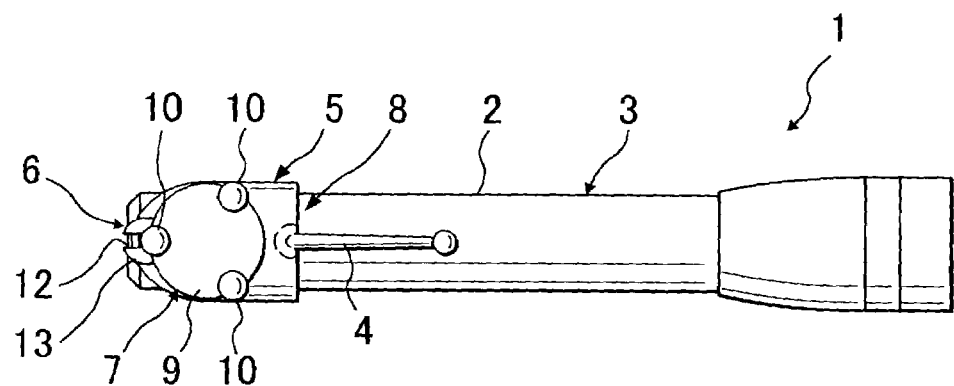
FIG. 3 is a bottom view showing a first embodiment of the present invention.
Figure 4:
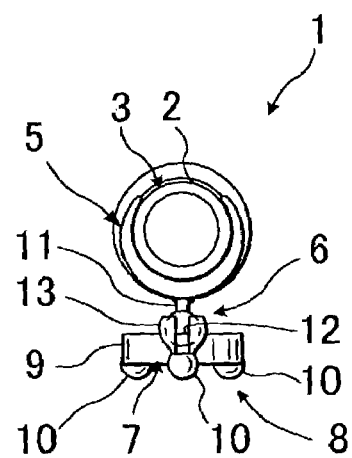
FIG. 4 is a side view showing a first embodiment of the present invention.
Figure 5:
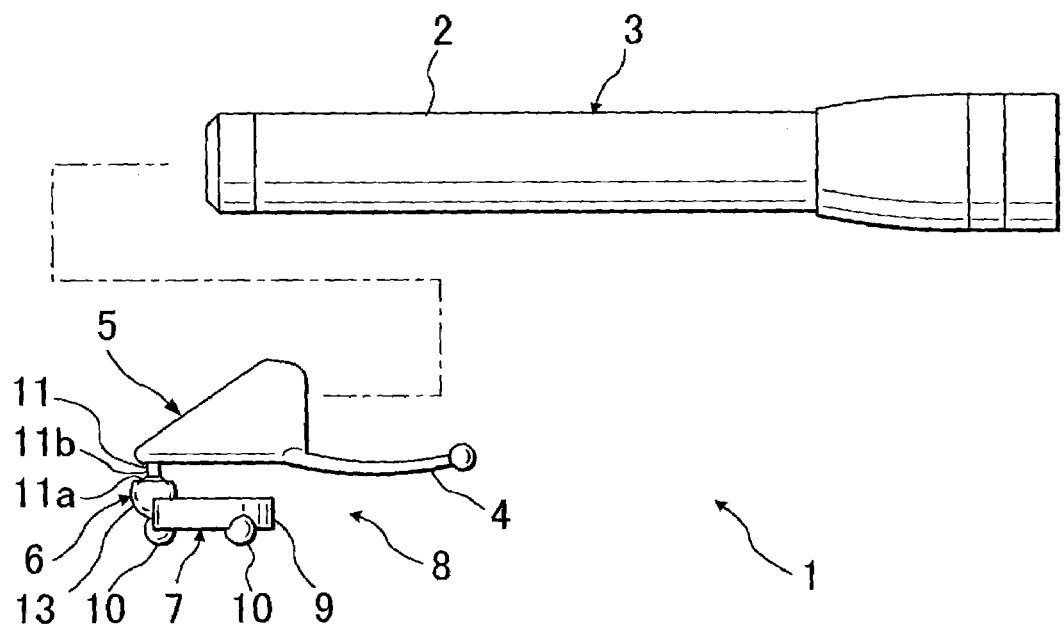
FIG. 5 is an exploded view showing a first embodiment of the present invention.
Figure 6:
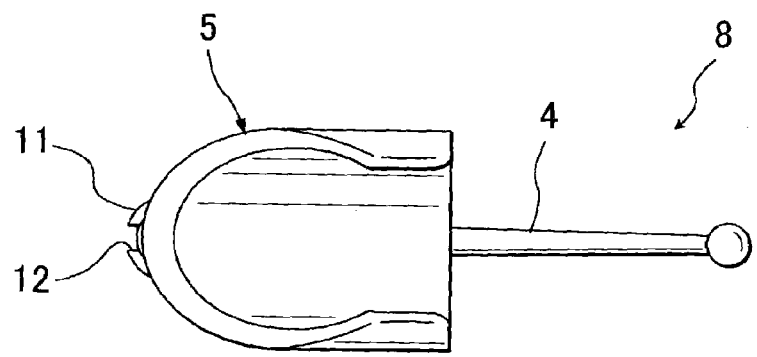
FIG. 6 is a top plan view of a support device showing a first embodiment of the present invention.
Figure 7:
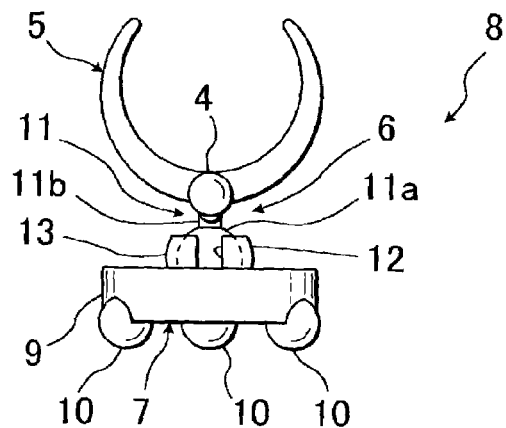
FIG. 7 is a right side view of a support device showing a first embodiment of the present invention.
Figure 8:
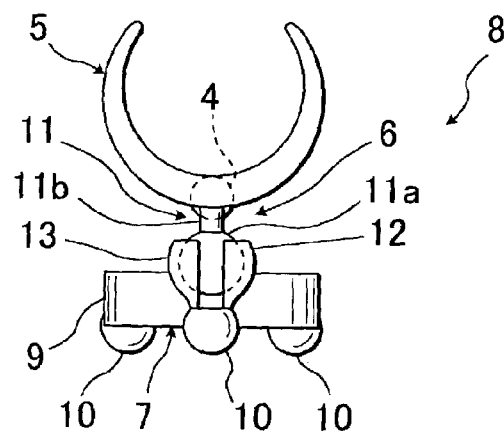
FIG. 8 is a left side view of a support device showing a first embodiment of the present invention.

Preferred embodiments of the present invention are described in more detail below with reference to the accompanying drawings.

An understanding of the present invention may be best gained by reference to FIGS. 1–10. Reference numeral 1 shows an electric light for work that is comprised of an electric light body 3 and a support device 8. In the electric light body 3, a grip part 2 is used as a flashlight formed in the shape of a stick.

The support device 8 further includes an engagement member 5 and a support stand 7. The engagement member 5, having a clip 4, formed in the shape of a C letter, is engaged fixedly and detachably with a back end of the grip part 2 of the electric light body 3. The support stand 7 can adhere fixedly to the metallic surface by magnetism, providing via a rotatable member 6 which can rotate more than 120 degrees with adding the power more than predetermined quantity to a back end of substantially center portion of the engagement member 5.

The support stand 7 consists of a support stand body 9 that is formed in the shape of a disk by ferromagnetic material and support legs 10, 10 and 10 which is formed in the shape of a projection or a hemisphere. The support legs 10 are fixed by as one, adsorption, adhesion or welding to an outer circumferential portion of a bottom face of the support stand body 9 at predetermined intervals.

The rotatable member 6 further includes a shaft 11 fixed at the back end portion of the engagement member 5 so as to project outwardly and a ball bearing 13 fixed at a top portion of one end of the support stand 7. A tip portion of the shaft 11 is formed in the shape of a ball 11a. The ball bearing 13 has cut parts 12 and 12 which are received a shaft part 11b so as to rotate by adding the power more than predetermined quantity to the ball 11a of the shaft 11.

Figure 9:
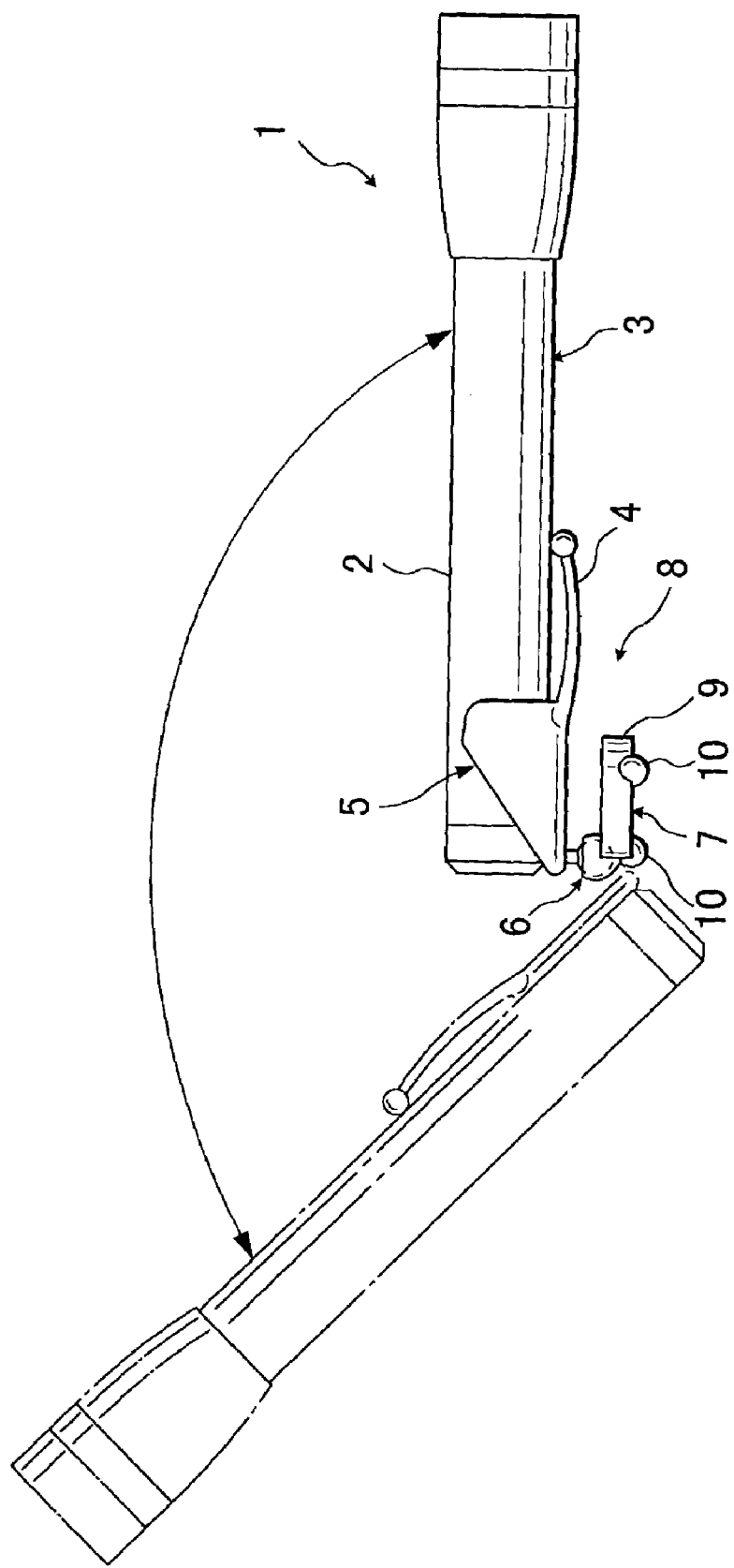
FIG. 9 is an explanation view when an electric light rotates.

In the electric light 1 for work, the support stand 7 of the support device 8 is adhered fixedly on the metal surface via the support legs 10, and the support stand 7 and the electric light body 3 engaged fixedly with the engagement member 5 are added more than predetermined power as shown in FIG. 9 so that it rotates within the range of 135 degrees. Then, the electric light 1 can light up the requested place certainly.

Figure 10:
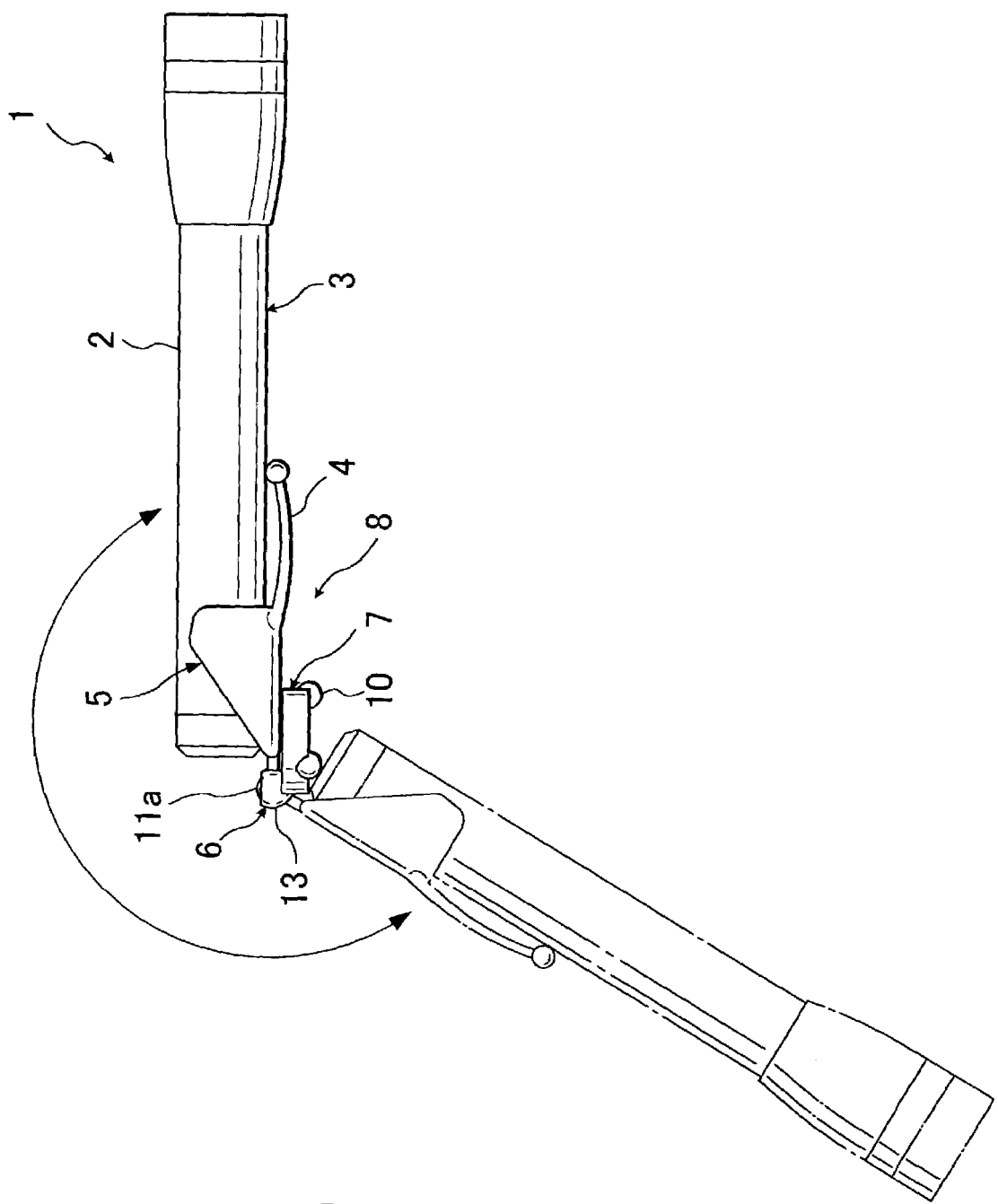
FIG. 10 is an explanation view when an electric light rotates.
Figure 11:
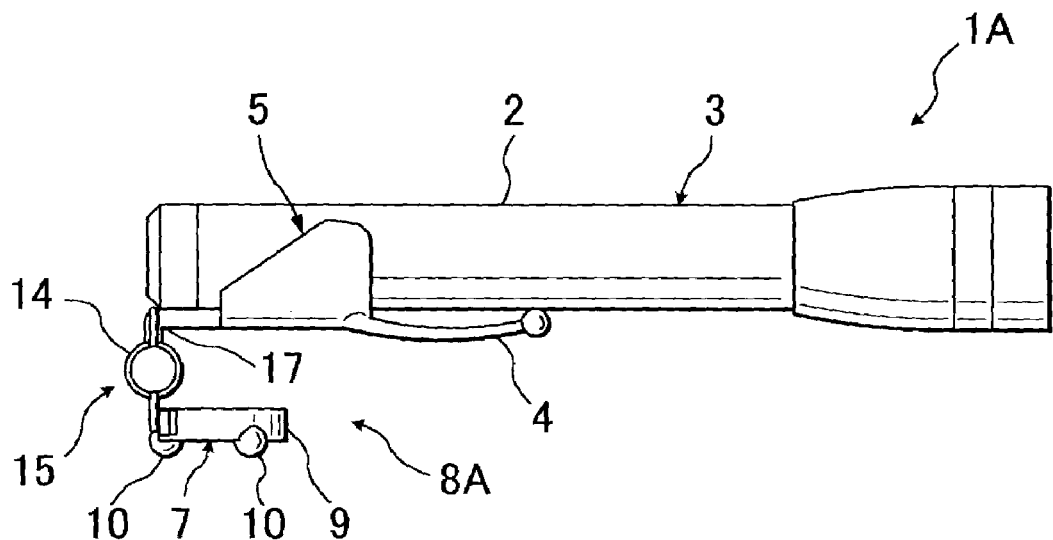
FIG. 11 is a front view showing a second embodiment of the present invention.
Figure 12:
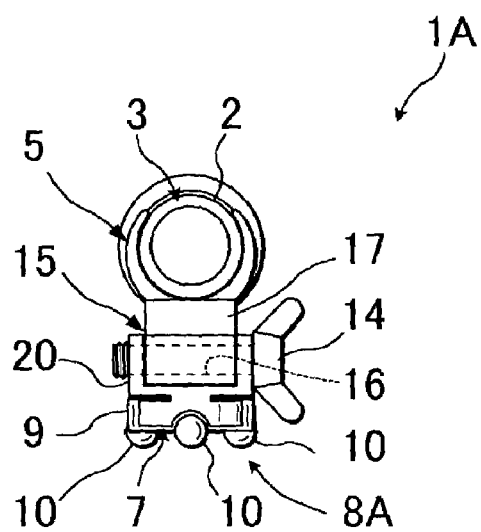
FIG. 12 is a side view showing a second embodiment of the present invention.
Figure 13:
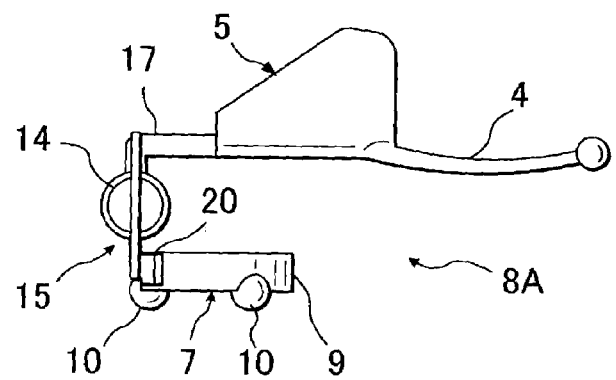
FIG. 13 is a front view of a support device showing a second embodiment of the present invention.
Figure 14:
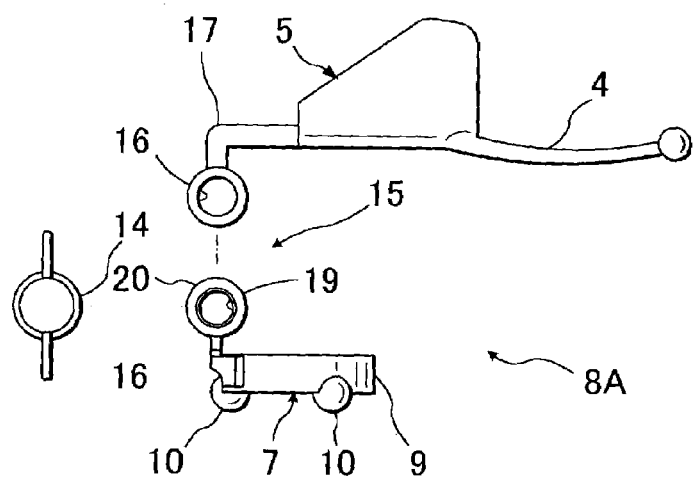
FIG. 14 is an exploded front view of a support device showing a second embodiment of the present invention.
Figure 15:
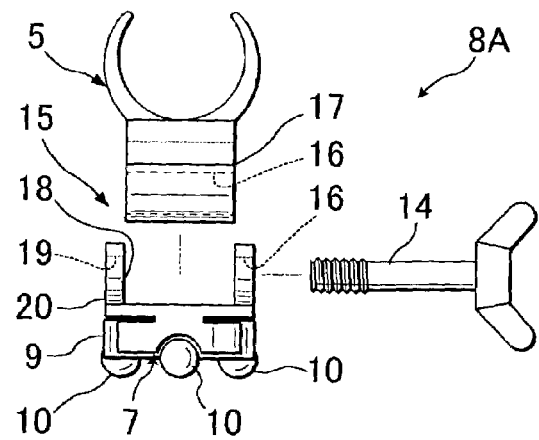
FIG. 15 is an exploded side view of a support device showing a second embodiment of the present invention.
Figure 16:
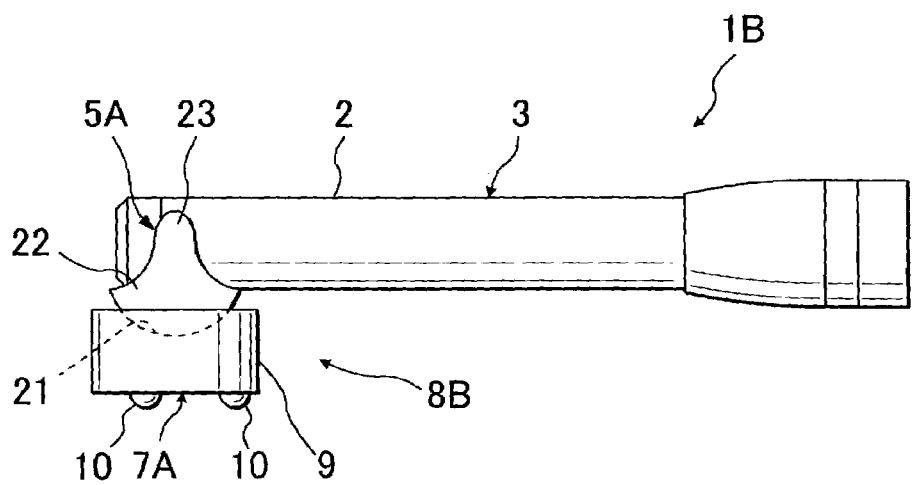
FIG. 16 is a front view showing a third embodiment of the present invention.
Figure 17:
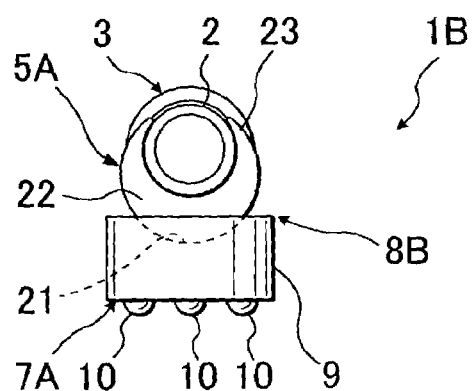
FIG. 17 is a side view showing a third embodiment of the present invention.
Figure 18:
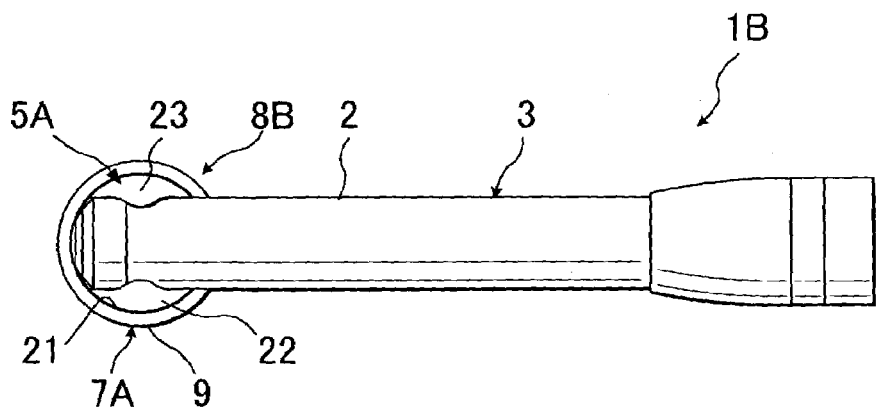
FIG. 18 is a top plan view showing a third embodiment of the present invention.
Figure 19:
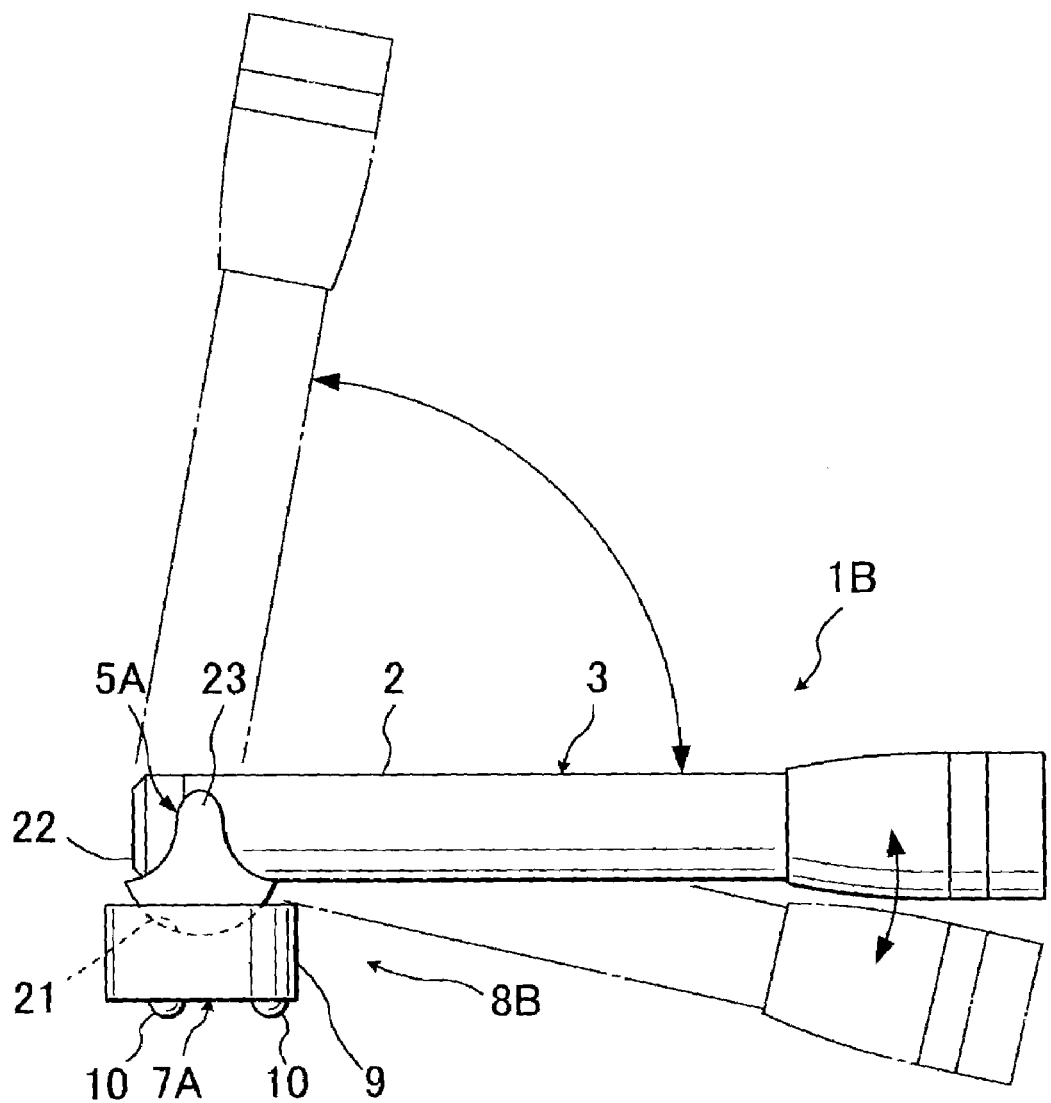
FIG. 19 is an explanation view when an electric light rotates.
Figure 20:
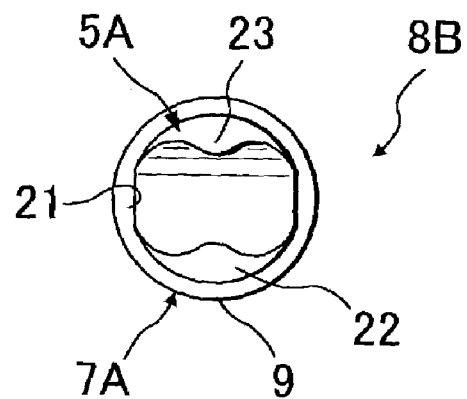
FIG. 20 is a top plan view of a support device showing a third embodiment of the present invention.
Figure 21:
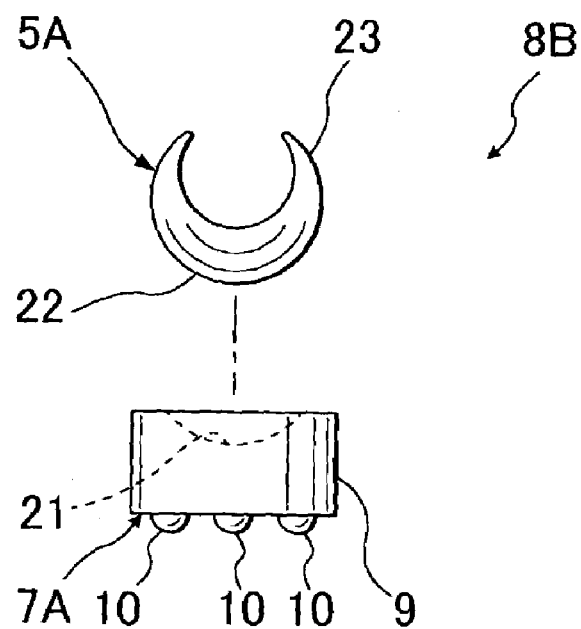
FIG. 21 is an exploded view of a support device showing a third embodiment of the present invention.
Figure 22:
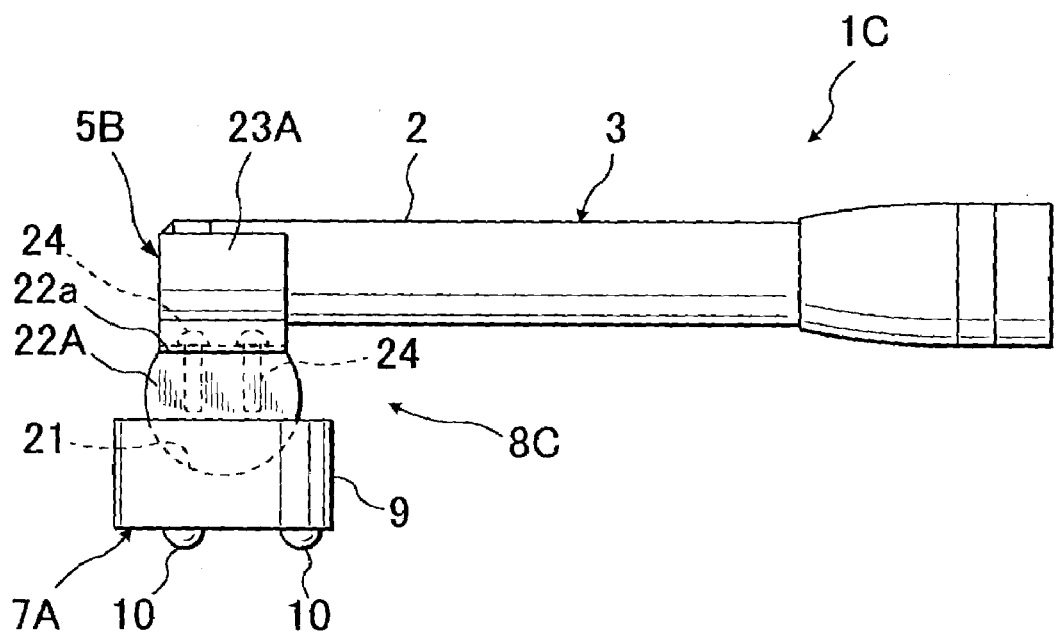
FIG. 22 is a front view showing a fourth embodiment of the present invention.
Figure 23:
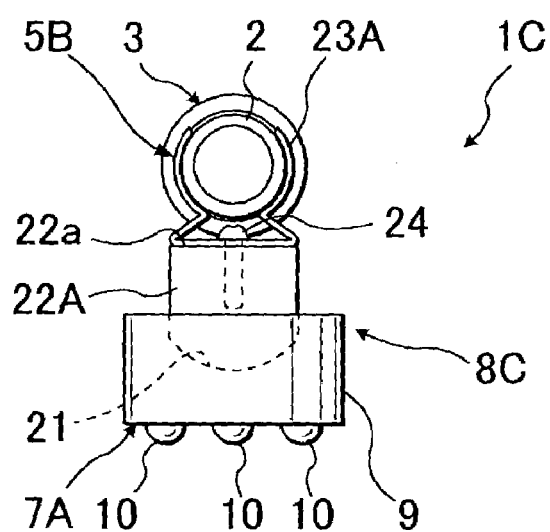
FIG. 23 is a side view showing a fourth embodiment of the present invention.
Figure 24:
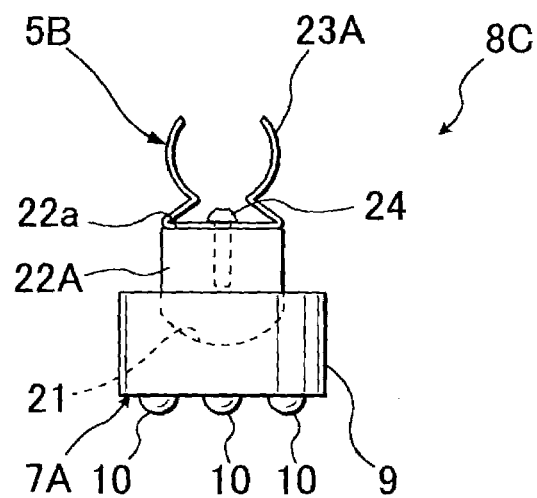
FIG. 24 is a side view of a support device showing a fourth embodiment of the present invention.
Figure 25:
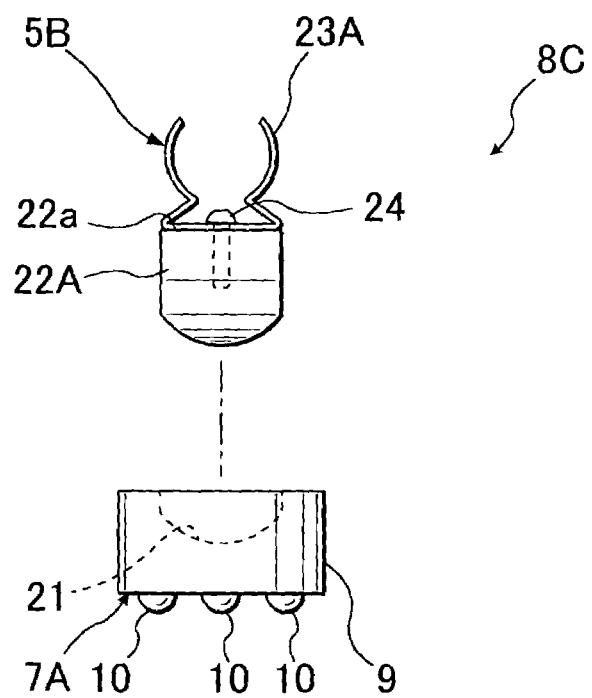
FIG. 25 is an exploded view of a support device showing a fourth embodiment of the present invention.
Figure 26:
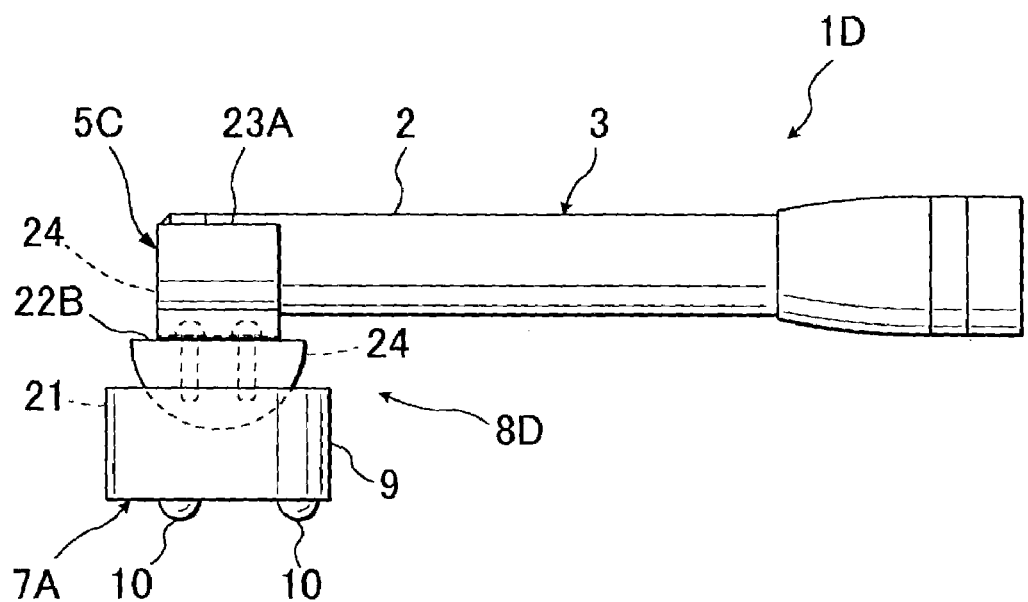
FIG. 26 is a front view showing a fifth embodiment of the present invention.
Figure 27:
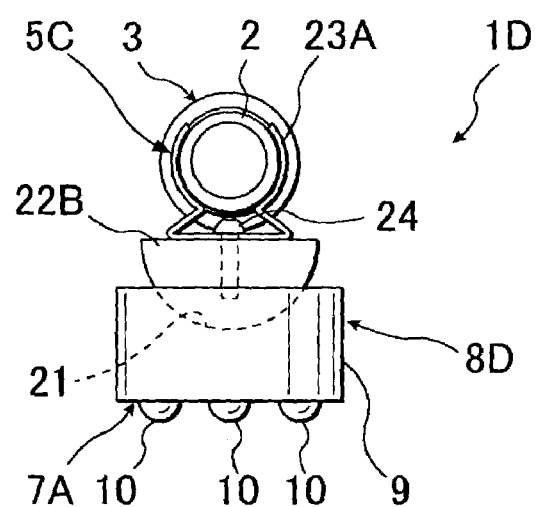
FIG. 27 is a side view showing a fifth embodiment of the present invention.
Figure 28:
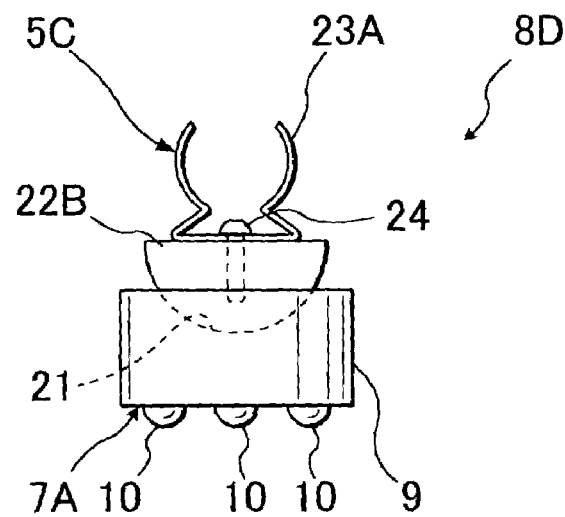
FIG. 28 is a side view of a support device showing a fifth embodiment of the present invention.
Figure 29:
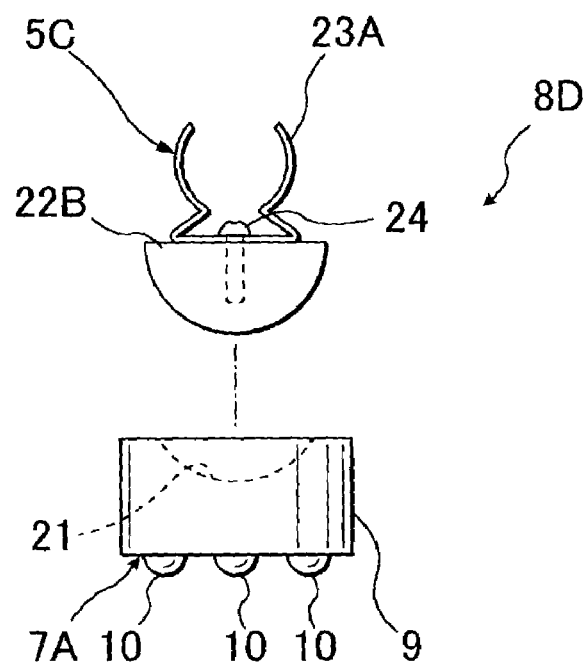
FIG. 29 is an exploded view of a support device showing a fifth embodiment of the present invention.

Moreover, in this embodiment, as shown in FIG. 10, the shaft 11 is attached to the back end portion of the engagement member 5 so that the electric light body 3 rotates within the range of 225 degrees. Then, the electric light 1 can light up the requested place certainly.

Other embodiments of the present invention will now be described with reference to FIGS. 11–37. In FIGS. 11–37, the same members as in the first embodiment described above with reference to FIGS. 11–37 are designated by the same reference numerals and therefore will not be further explained in great detail.

A second embodiment of the present invention is shown in FIGS. 11–15. It is distinguished from the first embodiment in that a support device 8A using a hinge member 15 as the rotation member is used, and the hinge member 15 can stop rotating by bolting of the butterfly bolt 14. An electric light 1A with the support device 8A according to the second embodiment has similar advantages to that according to the first embodiment.

In addition, the hinge member 15 is further includes a first hinge member 17 fixed to the engagement member 5; a concave part 18 entered the first hinge member 17 thereinto; and a second hinge member 20 fixed to the support stand 7. An insertion hole 16 is formed at a tip portion of the first hinge member 17. The second hinge member 20 has a screw hole 19 screwed a butterfly bolt 14 and located a part corresponding to the insertion hole 16 of the first hinge member 17.

A third embodiment of the present invention is shown in FIGS. 16–21. It is distinguished from the first embodiment in that a support device 8B includes a support stand 7A and an engagement member 5A. A concave part 21 formed in the shape of an arc is formed at an upper surface of the support stand 7A. The engagement member 5A further includes a support body 22 adsorbed the magnet formed in the shape of a semicircle arc which is adsorbed fixedly and rotatably to the concave part 21 of the support stand 7A at the predetermined quantity; and an engagement piece 23 jointed fixedly and detachably to the back end portion of the electric light body 3 provided integrally with the support body 22. An electric light 1B with the support device 8B according to the third embodiment has similar advantages to that according to the first embodiment.

A fourth embodiment of the present invention is shown in FIGS. 22–25. It is distinguished from the third embodiment in that a support device 8B is replaced with another support device 8C including an engagement member 5B. The engagement member 5B is comprised of a support body 22A formed mostly in the shape of an enclosure about the disk; and an engagement piece 23A, forming with a spring plate, attached to a central part of a flat face 22a of the support body 22A by screws 24 and 24. An electric light 1C with the support device 8C according to the fourth embodiment has similar advantages to that according to the third embodiment.

A fifth embodiment of the present invention is shown in FIGS. 26–29. It is distinguished from the fourth embodiment in that the support device 8C is replaced with another support device 8D including an engagement member 5C. The engagement member 5C is comprised of a support body 22B formed in the shape of a hemisphere and the engagement piece 23. An electric light 1D with the support device 8D according to the fifth embodiment has similar advantages to that according to the fourth embodiment.

Figure 30:
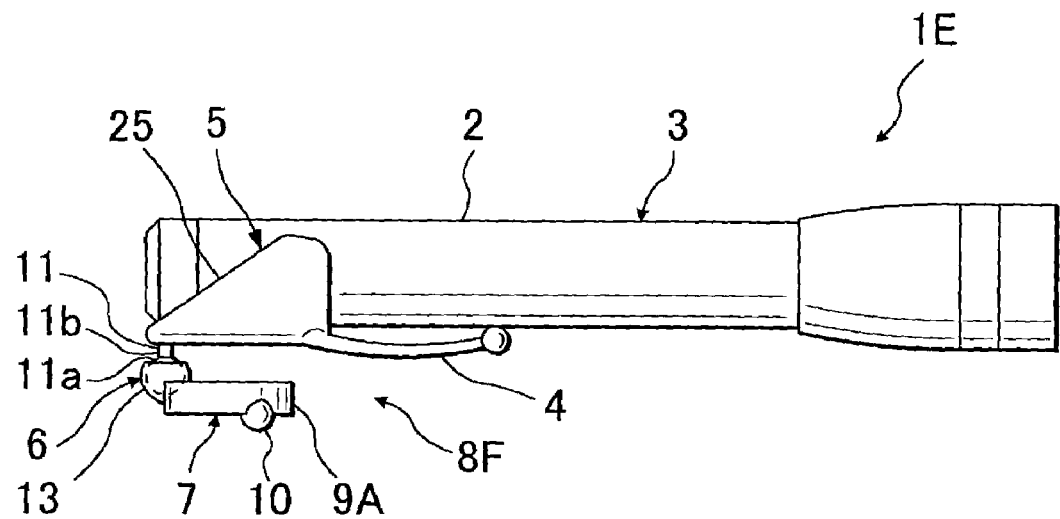
FIG. 30 is a front view showing a sixth embodiment of the present invention.
Figure 31:
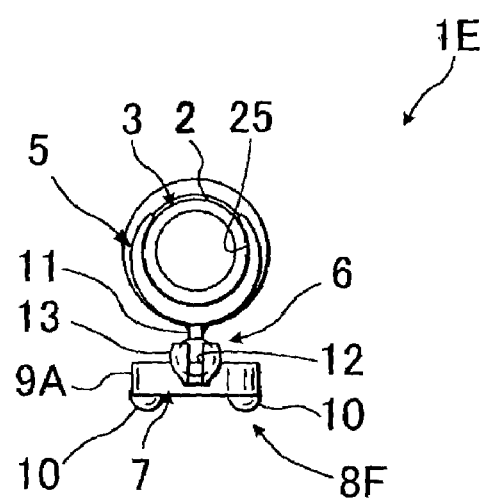
FIG. 31 is a side view showing a sixth embodiment of the present invention.

A sixth embodiment of the present invention is shown in FIGS. 30 and 31. It is distinguished from the first embodiment in that the engagement member 5 is attached to the a back end of the grip part 2 of the electric light body 3 by, for example one of adhesives, welding and screw, the adhesives as means 25 for fixing in this embodiment. Also a support device 8F includes a support stand body 9A attached two support legs 10 and 10 thereto. An electric light 1E according to the sixth embodiment has similar advantages to that according to the first embodiment.

Figure 32:
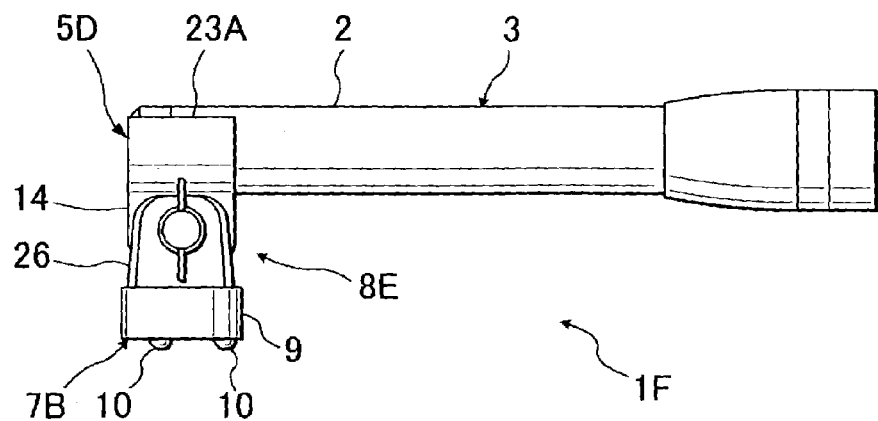
FIG. 32 is a front view showing a seventh embodiment of the present invention.
Figure 33:
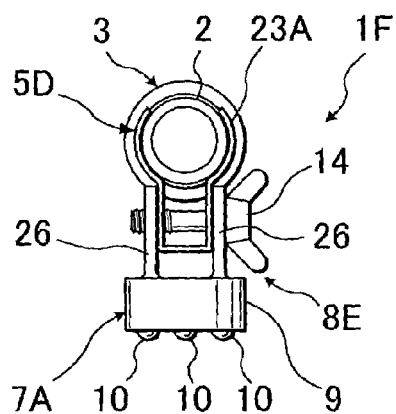
FIG. 33 is a side view showing a seventh embodiment of the present invention.
Figure 34:
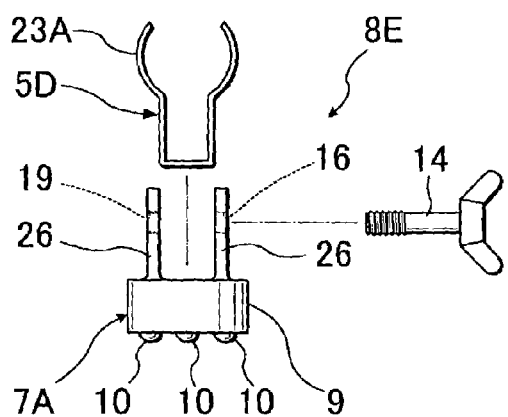
FIG. 34 is an exploded view of a support device showing a seventh embodiment of the present invention.

A seventh embodiment of the present invention is shown in FIGS. 32–34. It is distinguished from the fifth embodiment in that a support device 8E includes a support stand 7B and an engagement member 5D. The support stand 7B is formed a pair of support pieces 26 and 26 so as to project upwardly at both sides thereof. The engagement member 5D can be fixed at a rotating position by bolting of the butterfly bolt 14, inserting into the support pieces 26 of the support stand 7B. An electric light 1F with the support device 8E according to the seventh embodiment may be used.

Figure 35:
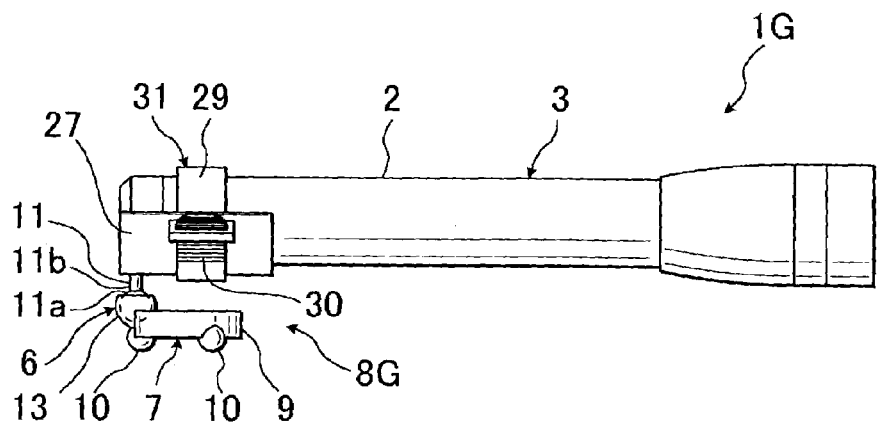
FIG. 35 is a front view showing an eighth embodiment of the present invention.
Figure 36:
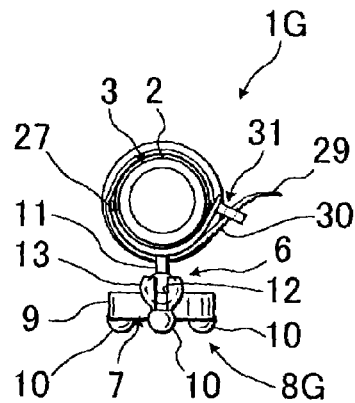
FIG. 36 is a side view showing an eighth embodiment of the present invention.
Figure 37:
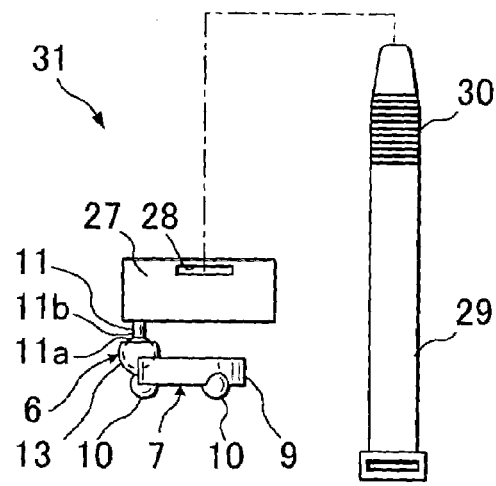
FIG. 37 is an exploded view of a support device showing an eighth embodiment of the present invention.

An eighth embodiment of the present invention is shown in FIGS. 35–37. It is distinguished from the first embodiment in that a support device 8G is comprised of a support member 27 with a bending shape which is attached the support stand 7 through the rotatable member 6, supporting the back end of the electric light body 3; a band insertion hole 28 formed a part adjacent one end portion of the support member 27; and a tightening band 31 having a band 29 inserted into the band insertion hole 28, capable of binding the back end of the electric light body 3 and tooth 30 formed at one side of the band 29. An electric light 1G with the support device 8G according to the eighth embodiment may be used.

In addition, in this embodiment, the tightening band, capable of canceling the tightening state of the belt 29, may be used, and the tightening band may be formed with the support member 27 integrally.

Moreover, in this embodiment, when the tip portion of the shaft 11 is formed in the shape of the ball 11*a*, the shaft 11 is attached or formed integrally to the back end of the electric light body 3, and the ball bearing 13 of the support stand 7 and 7A is attached to the ball 11*a*, it has similar advantages.

As set forth above, the advantages of the invention are as follows:

(1) An electric light for work comprises an electric light body having a grip part formed in the shape of a stick; an engagement member formed in the shape of a C letter, one of fixing and engaging fixedly and detachably with a back end of the grip part of the electric light body; and a support stand attached via a rotatable member which can rotate more than 120 degrees with adding the power more than predetermined quantity to a back end portion of a approximately center part of the engagement member, capable of adhering fixedly to the metal surface by magnetism so that the support stand can be used at an adsorption-fixation state.

Therefore, a part to illuminate can be illuminated without having by hand.

(2) As discussed above, the support stand can be located in the arbitrary directions, and the support stand and the electric light body can rotate in the range of 120 degrees or more.

Therefore, the lighting range of the electric light body installed in the fixed state spreads remarkably, and it can illuminate the part to illuminate certainly.

(3) As discussed above, it can attach only that the engagement member engages with the back end of the grip part of the electric light body fixedly or detachably.

Therefore, it is easy to attach can manufacture cheaply.

What is claimed is:

1. An electric light for illuminating a work space, comprising:
   a flashlight including an elongated body providing a grip area along a longitudinal extent thereof between a light emitting end and a back end of the elongated body;
   a C-shaped engagement member attached to the body adjacent to the grip area in a region proximate to the back end;
   a support stand including at least two support legs spaced apart from one another and adjacent an outer circumferential part of a bottom face of the support stand; and
   a rotatable member capable of rotating through a solid angle of more than 120 degrees, the rotatable member being fixedly attached at another portion thereof to a back end portion of the engagement member, and at least a bottom portion of the support stand being capable of magnetically adhering to a surface.

2. An electric light for illuminating a work space, comprising:
   an electric light body having an elongated, stick-shaped grip part with a back end located distant from a light emitting end opposite thereto;
   a C-shaped engagement member attached to the back end of the grip part; and
   a support stand rotatably engaged with a rotatable member at one portion of the rotatable member;
   the rotatable member being capable of rotating through a solid angle of more than 120 degrees, the rotatable member being fixedly attached at another portion thereof to a back end portion of the engagement member, and at least a bottom portion of the support stand being capable of magnetically adhering to a surface
   wherein the engagement member includes an engagement piece that is attached to the back end of the grip part of the electric light body and a support body fixed to the engagement piece, the engagement piece having a shape selected from the group consisting of: a sphere, a hemisphere, a semi-cylinder, and a cylinder; and
   the support stand being capable of magnetically adhering to the support body of the engagement member.

3. An electric light for illuminating a work space, comprising:
   a flashlight including an elongated body providing a grip area disposed along a region between a light emitting end and a rear end thereof;
   a support member having a tightening band removably binding the body in a region proximate to the back end of the body; and
   a support stand centrally attached to a back end portion of the support member by a rotatable member capable of rotating through a solid angle of more than 120 degrees, said support stand being capable of magnetically adhering to a metal surface.

4. An electric light for illuminating a work space, comprising:
   a support stand, capable of magnetically adhering to a metal surface, and forming an attachment part for an engagement member at an upper portion of the support stand;
   the engagement member having a rotatable engagement piece provided at attachment part for the engagement member;
   an electric light body of elongated dimension presented a grip region between a light emitting end and a back end, the engagement piece being attached to the electric light body at a part adjacent the back end of the electric light body; and
   at least two support legs spaced apart from one another and adjacent an outer circumferential part of a bottom face of the support stand.

5. A support device for an electric light for illuminating a work space, comprising:
   an electric light body having a stick-shaped grip part with a back end;
   a C-shaped engagement member, alternatively fixedly attachable and detachable with the back end of the grip part;
   a support stand capable of magnetically adhering to a metal surface;
   a rotatable member capable of rotating through a solid angle of more than 120 degrees, said C-shaped engagement member and said support stand being interconnected by said rotatable member, said rotatable member being disposed at a rearwardly facing end of said C-shaped engagement member; and
   at least two support legs spaced apart from one another and adjacent an outer circumferential part of a bottom face of the support stand.

* * * * *